UNITED STATES PATENT OFFICE.

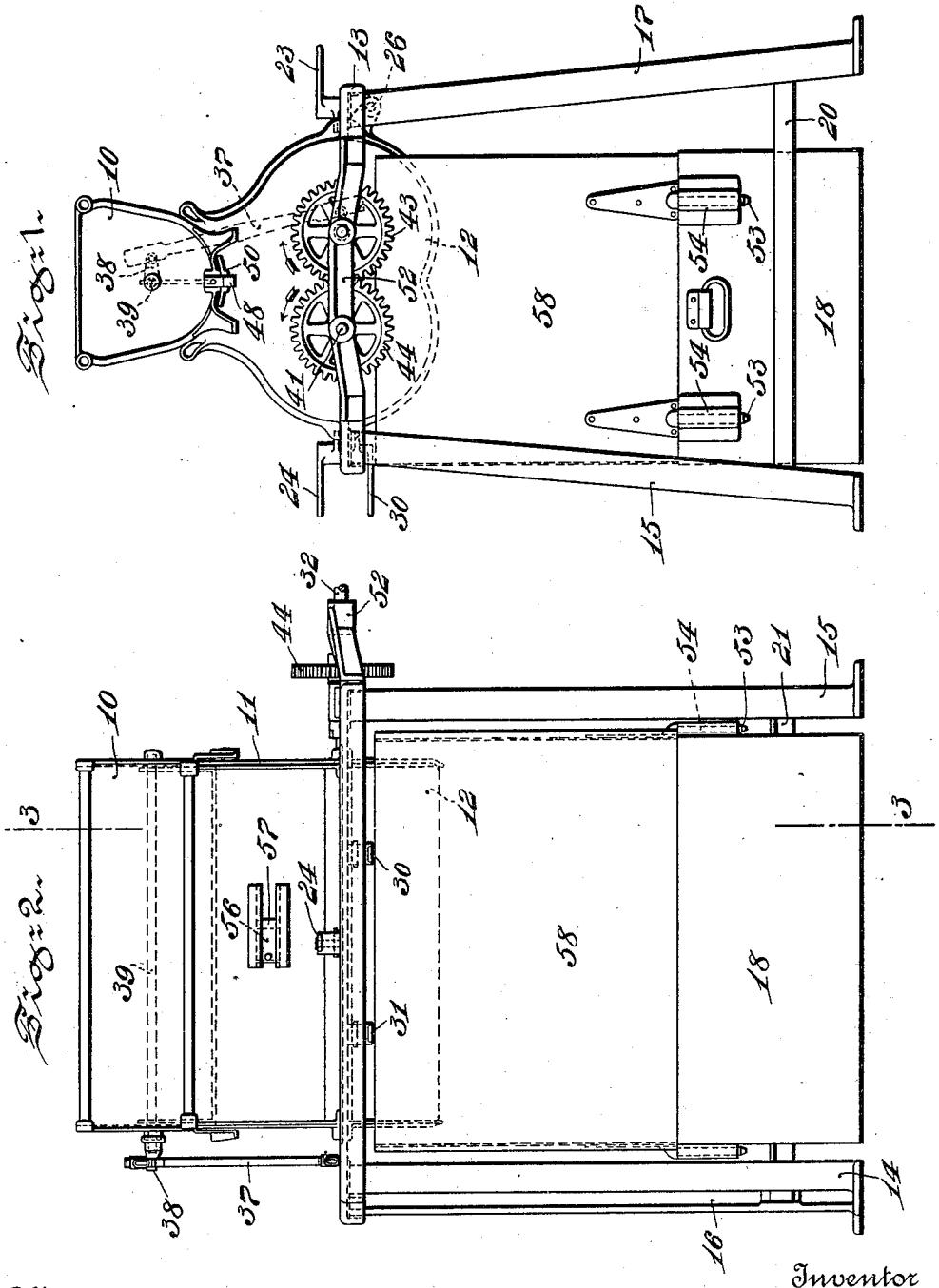

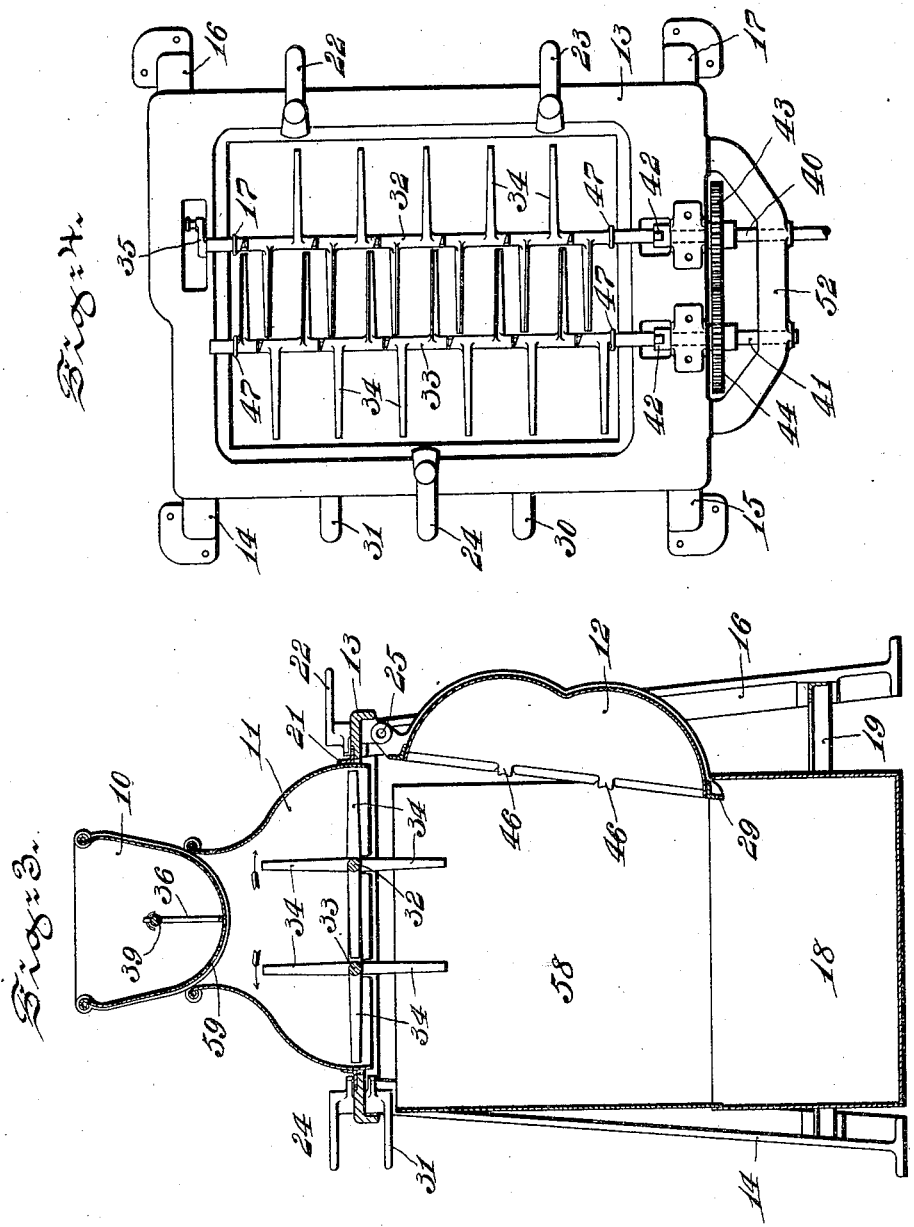

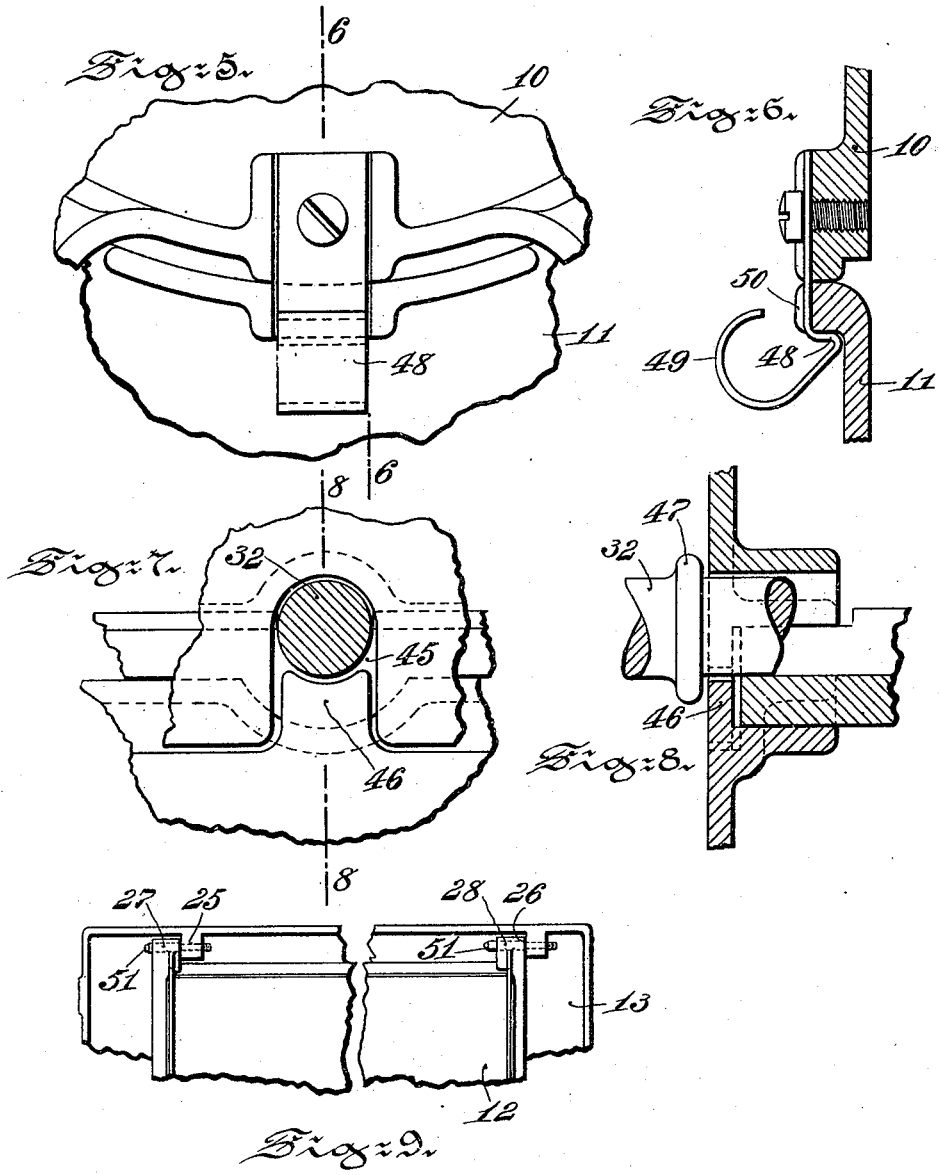

LYDIA COALE SHARPLESS, OF UTICA, NEW YORK, ASSIGNOR TO CYRUS CHAMBERS, JR., OF OVERBROOK, PENNSYLVANIA.

DOUGH-MIXING MACHINE.

No. 903,239.     Specification of Letters Patent.     Patented Nov. 10, 1908.

Application filed November 6, 1906. Serial No. 342,197.

*To all whom it may concern:*

Be it known that I, LYDIA COALE SHARPLESS, a citizen of the United States, residing at Utica, in the county of Oneida and State of New York, have invented a new and useful Dough-Mixing Machine, of which the following is a specification.

My invention relates to improvements in dough mixing machines.

My object is to provide improved means for associating the sifter hopper, air chamber and mixing basin and especially comprises improved means for admitting the liquid into the mixing basin and for discharging the contents of the mixing basin.

My invention also comprises improved catches for the various parts, improvements in the frame for supporting the operative mechanism, an improved water shed at the joint between the air chamber and mixing basin, and guiding means for the dough as the same is discharged from the mixing basin to a suitable receptacle.

My invention also comprises various improvements in details of construction.

Referring to the drawings:—Figure 1 is an end elevation of my device. Fig. 2 is a front elevation of same. Fig. 3 is a sectional view on line 3, 3 of Fig. 2. Fig. 4 is a plan view with the sifter and air chamber removed. Fig. 5 is a detail in elevation of a spring catch for securing the sifter to the air chamber. Fig. 6 is a section on line 6, 6 of Fig. 5. Fig. 7 is a detail in elevation showing portions of the air chamber and mixing basin approximate the mixing shaft. Fig. 8 is a sectional view on line 8, 8 of Fig. 7. Fig. 9 is a fragmentary plan view showing the hinged connection of the mixing basin with the framework.

Similar numerals refer to similar parts throughout the several views.

The general principle of operation of this device is similar to that described in patent to me No. 710,619 except as where herein specified to the contrary.

Referring to Figs. 1 and 2, 10 represents the sifter hopper which rests upon the air chamber 11, which superimposes the mixing basin 12. The air chamber and mixing basin are supported by the framework 13 which is supported on the four legs 14, 15, 16 and 17. These legs are braced each to the other at the two ends of the machine, and at the far side of the machine thus connecting the four legs together leaving the front open for the ready admission of the dough drawer 18, that is to say, 14 and 16 are connected by the brace or cross-bar 19; 15 and 17 by the cross-bar 20; 15 and 16 by the cross-bar 21. These cross-bars are preferably in the form of angle irons.

The air chamber 11 is provided with the flange 21 around its four sides and considerably above its lower edge. This flange is adapted to rest upon the top of frame 13 and to permit the lower extension of the air chamber 11 to project downwardly below the top of said framework and into and below the upper edge of the mixing basin 12, when said mixing basin is in the operative position, thus forming a smooth continuous surface past the joints between the air chamber and frame and between the basin and air chamber whereby liquid and flour put into the machine through the air chamber will be conducted down past the joints without leakage therethrough. The air chamber 11 is maintained in position on frame 13 by the swinging catches 22, 23 and 24 turning on vertical axes.

The mixing basin is hinged to the underside of frame 13 to the lugs 25 and 26. It will be noted that the lugs 27 and 28 of the basin are on similar sides of lugs 25 and 26 respectively so that when the basin is in the lowered position as shown in Fig. 3 it may be slipped off the pins of the hinges and thus entirely removed from the machine for convenience in cleaning. Basin 12 is also provided at the opposite side from the hinge side with the flange 29 which is engaged by the swinging catches 30 and 31 to hold the basin in the operative position. Swinging catches 30 and 31 also turn on vertical axes. The mixing shafts 32 and 33 are provided with the mixing blades 34 and are supported in open half boxes in the frame 13. These mixing blades 34 are inclined as to one face, the blades of one shaft being inclined in a direction opposite to the blades of the other shaft and are adapted normally to be turned in the direction indicated by the arrows in Fig. 3. The blades of one shaft are so positioned with respect to the blades of the other shaft that when said shafts are turned backwards or in a direction opposite to that indicated by the arrows, the said blades are adapted to wipe each other, to strip the dough clinging thereto, when it is desired to discharge the dough into the drawer.

Shaft 32 is provided with the crank 35 for operating the sifter bar 36 through connecting rod 37 which is secured at its upper end to crank 38 on the shaft 39, see Fig. 1. The two mixing shafts are disengageably connected with the driving shafts 40 and 41 by a tapered slot and tenon connection as at 42, see Fig. 4.

To shaft 40 is connected the motor, driving pulley or the fly wheel and winch for operating the same, not shown. Rotary movement is communicated from shaft 40 to shaft 41 through the pinions 43 and 44. At the points where the shafts project through the air chamber recesses 45 are provided in the lower edge of air chamber 11 and lugs or ears 46 are provided upon the upper edge of the mixing basin to close the recesses 45 beneath said shafts. The space between shaft and recess 45 is further closed by the collar 47 on the shaft. The outer ends of the driving shafts 40 and 41 are supported by the bracket 52. The bracket 52 extends from the side of frame 13 and incloses the gear wheels 43 and 44. The dough drawer 18 is adapted to slide under the machine and between the front legs 14 and 15 supporting the same. This drawer is of greater length than the extreme length of the basin, and is of such height as to allow the body of the basin 12 to pass over its edge when the drawer is in place and the basin dropped, and the flange 29 on the front of the basin to project down into the drawer to form a continuous guide for the dough from the basin into the drawer. At the two ends of this drawer are attached the plates of sheet iron such as 58, in line with the inner side of the ends of said drawer, projecting up into the underside of the frame 13 of the machine and secured to the drawer by projecting pins 53 entering into sockets 54 on the outer ends of the drawer, see Figs. 1 and 2. When the mixing basin 12 is dropped it passes freely between these side guides and as the dough issues from the basin it is guided thereby to the drawer 18. The front edge of the drawer is also provided with a similar plate 58 to prevent the dough from falling outside of the drawer when being dumped from the basin.

An aperture 56 is provided in the side of air chamber 11 for the admission of liquid thereto into the mixing basin 12. This aperture is normally closed by the sliding door 57 to prevent the escape of flour and liquid therethrough.

As above stated the sifting hopper 10 rests upon the open top of the air chamber 11. The said sifting hopper is normally maintained in said position on the air chamber by the engagement of the spring catches 48 which are secured to the ends of said sifting hopper. These catches coöperate with lugs 50 secured to the upper sides of the air chamber. These springs 48 are provided with the outwardly curved part 49 for convenient manual operation when it is desired to disengage said sifting hopper from the air chamber. That is to say, when seizing the sifting hopper between the hands by the operator in the act of lifting the same from the air chamber, a finger is inserted in the loop or curved part 49 so that the point or projection 48 is easily withdrawn from the lug 50.

The operation of my device is as follows:—The basin 12 is secured by the swinging catches 30 and 31 in the horizontal position against the underside of frame 13. The shafts 32 and 33 are placed in their proper relative positions as required by the couplings. The air chamber 11 is placed on top of the main frame 13 and secured thereto by the swinging catches 22, 23 and 24. The sifter hopper 10 is secured on top of the air chamber by the spring catches 48. The connecting rod 37 is secured to the crank 35 of mixing shaft 32 and crank 38 of the sifter shaft 39. Power is applied to shaft 32. The requisite amount of moisture such as water, milk and yeast, together with the salt and sugar necessary to make the required amount of dough is placed in the mixing basin 12 by pouring it through the opening 56 in the air chamber 11. When this is completed the sliding door 57 is closed and the requisite amount of flour is placed in sifter hopper 10. The sifter bar 36 operated by the sifter shaft 39 vibrates upon the curved bottom of the sifter hopper, which bottom is perforated in the usual way as indicated at 59 in Fig. 3.

By the vibration of the sifter yoke, flour is forced through the bottom of the sifter hopper and falls through the air chamber on and between the mixing shafts to the mixing basin where it comes in contact with the moisture and is mixed in the usual way. When this mixture becomes viscous or ropy, then the ropy dough is lifted up and drawn through the air as the knives draw apart from one another above the line of liquid or above the center of the mixing shafts. This operation is continued until all the flour has been sifted from hopper 10 into the mixing basin 12 and the dough becomes sufficiently stiff to be entirely lifted from the basin by the mixing blades and is drawn apart in the air chamber to thoroughly aerate the same.

When the process of aerating is completed and it is desired to remove the dough from the machine, this is done by disengaging the front flange 29 of the basin from the catches 30 and 31 and permitting the basin to swing on its hinges into the position shown in Fig. 3. When the basin has assumed the position shown in Fig. 3 the bulk of the dough will fall from the basin into the drawer 18. The sheet iron guides 58 will prevent the dough from falling over the edges of the drawer to the outside thereof.

When the mixing blades are turned backwards, that is in the direction opposite to that indicated by the arrows in Fig. 3, the greater portion of the dough sticking to the blades will be scraped from each other as above described and the same will drop directly into the drawer. When this operation is completed the connecting rod 37 is removed from cranks 35 and 38, the air chamber 11 is disengaged and lifted from frame 13 leaving the mixing shafts exposed and accessible for clearing them of the remaining dough or removing them from their bearings if necessary. The dough adhering to the basin is also scraped into the dough-drawer when the drawer may be removed and the dough treated as is usual after mixing.

What I claim is:—

1. In a dough mixing machine, the combination of an air chamber, a mixing basin and a supporting frame therefor, the air chamber provided with a horizontal flange surrounding its four sides considerably above its lower edge, said flange adapted to engage with the frame to support the air chamber, the walls of the air chamber below the flange adapted to project below the supporting frame and into the mixing basin and below the upper edge of the walls thereof.

2. In a dough mixing machine, comprising a mixing basin adapted to swing from the horizontal to the vertical position, to discharge the dough, a receptacle for receiving said dough and plates for guiding the dough from the basin to said receptacle.

3. In a dough mixing machine, comprising a mixing basin adapted to swing from the horizontal to the vertical position, to discharge the dough, a receptacle for receiving said dough and plates for guiding the dough from the basin to said receptacle, said guide plates being disengageably connected with the receptacle.

4. In a dough mixing machine, comprising a mixing basin, a pair of parallel shafts provided with mixing blades to operate therein, said blades having one surface inclined to their axis of rotation, the blades of one shaft interdigitating with the blades of the other shaft and adapted normally to separate above the shafts, the said blades of one shaft being so associated with respect to the blades of the other shaft, that when turned in the reverse direction, they will serve to wipe the dough from each other.

5. In a dough mixing machine, comprising a mixing basin, a pair of parallel shafts provided with mixing blades, each blade having one face inclined to the axis of rotation, the inclined faces of the blades of one shaft being opposite to the inclined faces of the blades of the other shaft, the blades of one shaft being so positioned with respect to the blades of the other shaft, that when shafts turned backwards or in the reverse to normal direction, they will wipe each other, to strip the same of clinging dough.

LYDIA COALE SHARPLESS.

Witnesses:
FRANK E. HENABRAY,
CLARISSA R. BREWER.